(12) United States Patent
Ding

(10) Patent No.: US 7,092,185 B2
(45) Date of Patent: Aug. 15, 2006

(54) WRITE GATE TIMING FOR A SERVO BANK

(75) Inventor: Tianyang Ding, San Jose, CA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 10/887,149

(22) Filed: Jul. 8, 2004

(65) Prior Publication Data

US 2006/0007580 A1    Jan. 12, 2006

(51) Int. Cl.
*G11B 15/04* (2006.01)
*G11B 19/04* (2006.01)

(52) U.S. Cl. .............. 360/60; 360/51; 360/46; 360/48; 360/75

(58) Field of Classification Search ............ None
See application file for complete search history.

(56) References Cited

U.S. PATENT DOCUMENTS

| | | | |
|---|---|---|---|
| 2,894,796 A * | 7/1959 | Reynolds | 360/68 |
| 4,390,912 A * | 6/1983 | Hertrich et al. | 360/78.14 |
| 4,541,019 A * | 9/1985 | Precourt | 360/15 |
| 4,851,933 A * | 7/1989 | Sugaya et al. | 360/61 |
| 4,853,799 A * | 8/1989 | Aikawa | 360/48 |
| 5,070,421 A * | 12/1991 | Sumiya et al. | 360/77.07 |
| 5,214,545 A * | 5/1993 | Maeda | 360/75 |
| 5,519,546 A * | 5/1996 | Lewis | 360/48 |
| 5,574,702 A * | 11/1996 | Ishii | 369/13.22 |
| 5,684,972 A * | 11/1997 | Hill et al. | 711/4 |
| 6,064,537 A * | 5/2000 | Okawa | 360/66 |
| 6,219,722 B1 * | 4/2001 | Tomita | 710/14 |
| 2004/0190174 A1 * | 9/2004 | Yoshida et al. | 360/51 |

* cited by examiner

*Primary Examiner*—Wayne Young
*Assistant Examiner*—Dismery Mercedes

(57) ABSTRACT

A recording system records sector information on a recording medium, such as a hard disc drive, using a write gate signal. Timing of the write gate signal enables writing a servo data patterns over the servo wedge fields of the disc and, if the hard disc drive contains prior recorded data, writing null data over selected sector segments of the hard disc.

19 Claims, 4 Drawing Sheets

WRITE GATE TIMING FOR A SERVO BANK

BACKGROUND OF THE INVENTION

1. Field of the Invention

The present invention relates to data recording in a communications system, and, more particularly, to writing information from a channel to a recording medium.

2. Description of the Related Art

Conventional recording systems of the prior art encode data and write the encoded data to a recording medium, such as a magnetic hard drive or an optical recording disc. The encoded data is written to the disc (or other recording medium) as servo sector information by a write head. A servo sector is a prerecorded reference track on the dedicated servo surface of a disc drive. Most magnetic disc drives have many disc surfaces, with each surface having a corresponding magnetic head mounted on an actuator (e.g., a Head Stack Assembly or HSA). All data track positions are compared to their corresponding servo track to determine off-track/on-track position. The cylindrical surface formed by identical track numbers on vertically stacked discs is termed a "cylinder". At any location under the write head, all tracks under all heads form a cylinder. The cylinder number is one of the three address components required to find a specific address, where the other two address components are head number and sector number. In a wedge-based servo sector system, a certain part of each cylinder contains servo-positioning data (a servo data pattern). Gap spacing (termed a servo "wedge" field or "servo data segment") between each sector contains a servo data pattern to maintain position on that cylinder.

During fabrication in a factory and before shipment of a hard drive, a servo track writer records the servo data patterns on the recording surface. Writing of a servo pattern is accomplished by the servo track writer during "servo bank write mode" or SBWM. Bank writing writes to multiple surfaces since most drives have many disc surfaces. The total servo track writing time increases dramatically with each new generation of recording drives as capacity increases. Thus, if a servo track writer were to write only one head at a time, the disc drive throughput of the fabrication factory would decrease as the number of tracks and TPI (tracks per inch) increase.

Consequently, it is preferable to enable writing servo data patterns by as many write heads as possible. However, writing is accomplished through a write channel preamplifier (preamp) that is enabled by a signal from a write gate. Increasing the number of heads written at the same time increases the power dissipation of the preamp. Preamps of the prior art may be required to support writing of up to eight channels (i.e., eight heads) at the same time. Increasing the number of heads written at the same time also increases the bandwidth of a read channel amplifier employed to read data from the recording medium during the servo track writing verification process. These competing requirements result in a major challenge to efficiently manage SBWM operation.

Preamps of the prior art generally guarantee writing in SBWM of up to two channels at the same time without relatively high power dissipation. With such a prior art preamp, drive vendors designing 4–8 channel drives cannot write, for example, to all 4–8 heads within one pass of servo bank writing. Typically, servo bank writing is accomplished by writing to the drive in staggered mode. In staggered mode for a 8-head drive, the write head writes track N first on heads 0&1, then on heads 2&3, and then on heads 4&5. After track N is written on all six heads, the write head steps to the next track (N+1) and repeats the process. One drawback to staggered bank write mode is reduced factory throughput since the time required to finish writing 4 or 6 or 8 head drives is doubled or tripled or quadrupled, respectively.

Alternatively, servo data patterns are written with a write gate (WG) opening only during the servo data segment, or servo wedge field, of the disc. "WG opening" refers to the period when the write head is enabled (e.g., by an enabling signal to a logic gate) to allow servo data patterns to be recorded onto the recording medium by the write head. WG opening only during the servo wedge field might dramatically reduce the WG duty cycles required to write an entire disc surface, however, it does not erase an old servo or other data pattern if the disc media was previously recorded on. If an old data pattern is not erased, a servo controller may have difficulty locking onto a newly recorded servo data pattern when the disc drive is in self-test mode. FIG. 1 shows SBWM WG Timing and Duty Cycles for staggered bank mode writing. FIG. 2 shows SBWM WG Timing and Duty Cycles for WG opening for writing only during the servo wedge field.

In FIG. 1, the WG is open within one revolution of disc rotation. In this mode, the WG duty cycle is the timing per RPM divided by the sum of i) the timing of one RPM and ii) the head stepping time. For a 7200 RPM drive application: T1 is the timing of one RPM=60/7200 (=8.33333 ms); T2 is the timing for head stepping (normally around 4 to 5 ms); and the WG duty cycle "WG_Duty_Cycle_0" is approximately T1/(T1+T2)*100%=62.4% to 67.5%.

In FIG. 2, the WG is open only on every servo wedge field. Normally, the time to cover the servo wedge field is about 10% of the time to cover between wedges (i.e., wedge-to-wedge timing), for example, assuming a 7200 RPM drive application. For the example of a 7200 RPM drive, T1=8.333 ms. If N is the number of servo wedges per track, then the wedge-to-wedge timing is approximately T/N. Assuming N=300, then wedge-to-wedge timing (T3) is approximately 27.776 μs and the servo wedge field time (T4) is about 10% of 27.776 μs (i.e., T4≈2.776 μs). Then, within one track, the effective write gate duty cycle (WO Duty Cycle_1') is T4/T3*100%=10%, and the total WG duty cycle (WG_Duty_Cycle_1) is approximately WG_Duty_Cycle_0*WG_Duty_Cycle_1'=6.24–6.75%

SUMMARY OF THE INVENTION

The present invention relates to recording sector information on a hard disc drive using a write gate signal. In accordance with embodiments of the present invention, one or more servo data patterns are recorded to a recording medium by writing data to the recording medium in accordance with a write gate signal. The write gate signal is generated such that timing of the write gate signal enables 1) writing of a servo data pattern as the data to a corresponding servo data segment of the recording medium and, 2) if the recording medium includes prior recorded data, writing null data as the data over selected sector segments of the recording medium.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
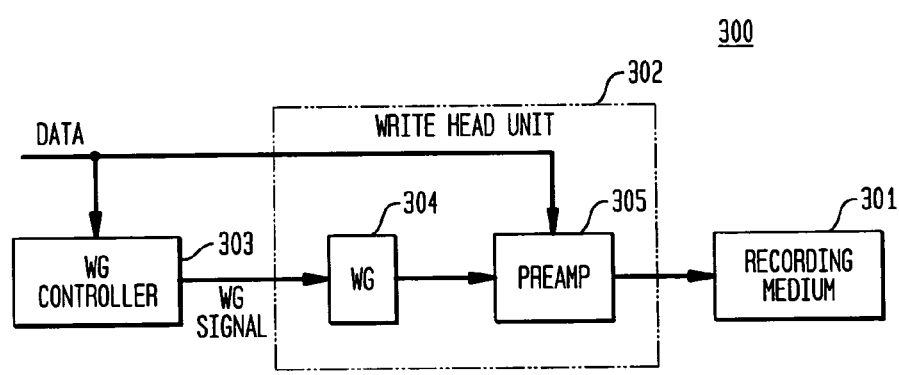
FIG. 3 shows a recording system operating in accordance with one or more embodiments of the present invention.

FIG. 3 shows recording system 300 operating in accordance with one or more embodiments of the present invention. Recording system 300 encodes and writes data to recording medium 301, such as a magnetic hard drive or an optical recording disc. Data written by recording system 300 includes servo data patterns recorded to servo data segments (e.g., servo wedge fields) of the recording medium. The servo data segment may be, for example, a servo wedge field of a magnetic hard disc having a wedge-based servo sector configuration. The servo data patterns are written to the multiple disc (or similar recording medium) surfaces by write head unit (WHU) 302 under control of write gate (WG) controller 303. WHU 302 employs bank writing to write servo sector information to multiple disc surfaces, with each surface having a corresponding write head mounted on an actuator (e.g., a Head Stack Assembly).

WHU 302 includes write gate (WG) 304 and preamplifier (preamp) 305. Writing by the write head of WHU 302 is enabled by a write gate (WG) signal applied to WG 304. WG 304 enables recording and transfers servo data pattern to preamp 305 when the WG signal is in an enabled state. The WG signal is generated by WG controller 303 in accordance with an exemplary embodiment of the present invention.

Figure 4:
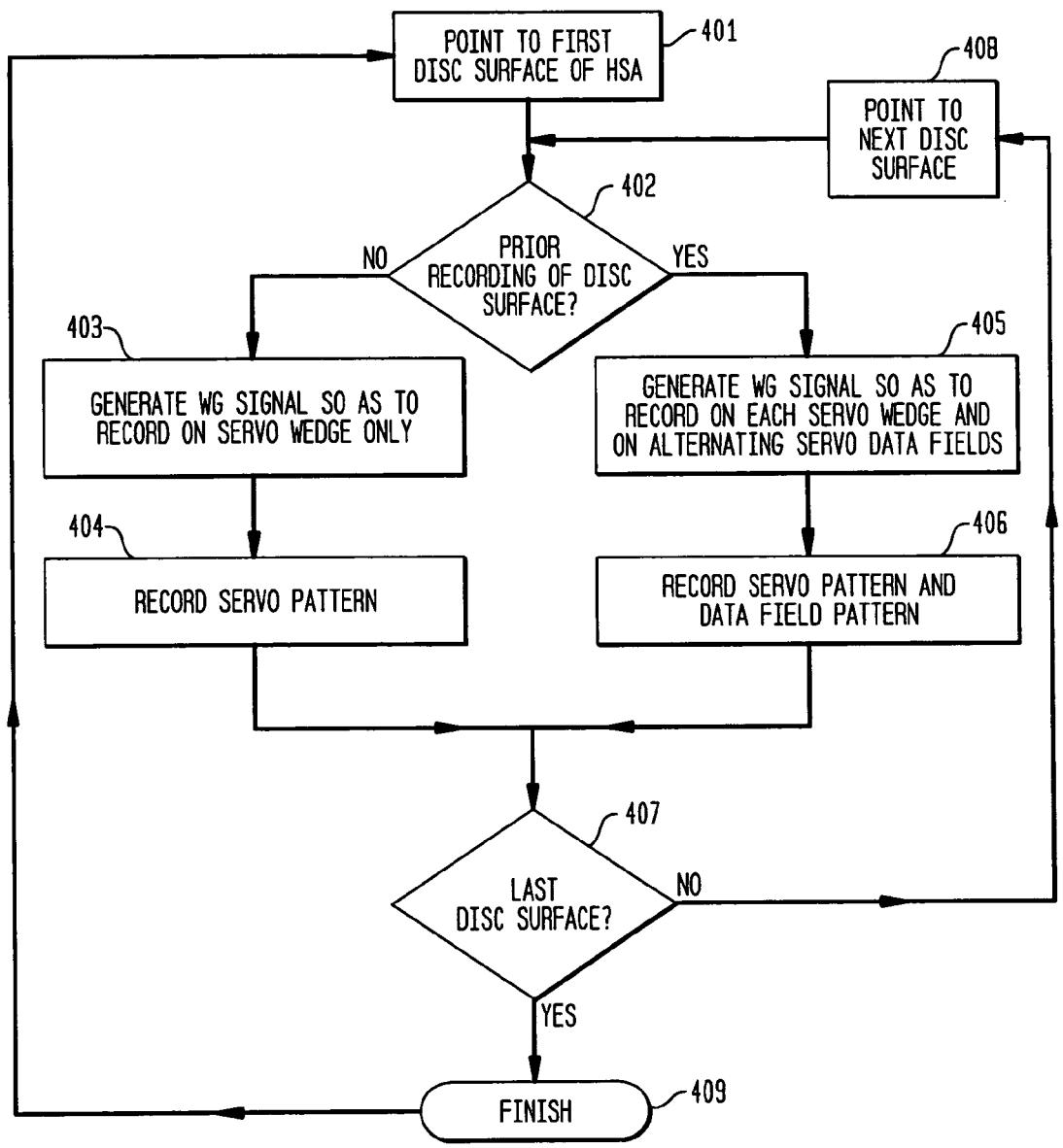
FIG. 4 shows an exemplary method employed by the write gate controller of FIG. 3.

FIG. 4 shows an exemplary method employed by WG controller 303 of FIG. 3. At step 401, the WG controller identifies the first disc surface to write servo data patterns to. At step 402, a test determines whether there is prior recorded information on the disc. Such test might either expressly detect the presence of written data on the disc or receive user-input information as to the status of the disc.

Figure 2:
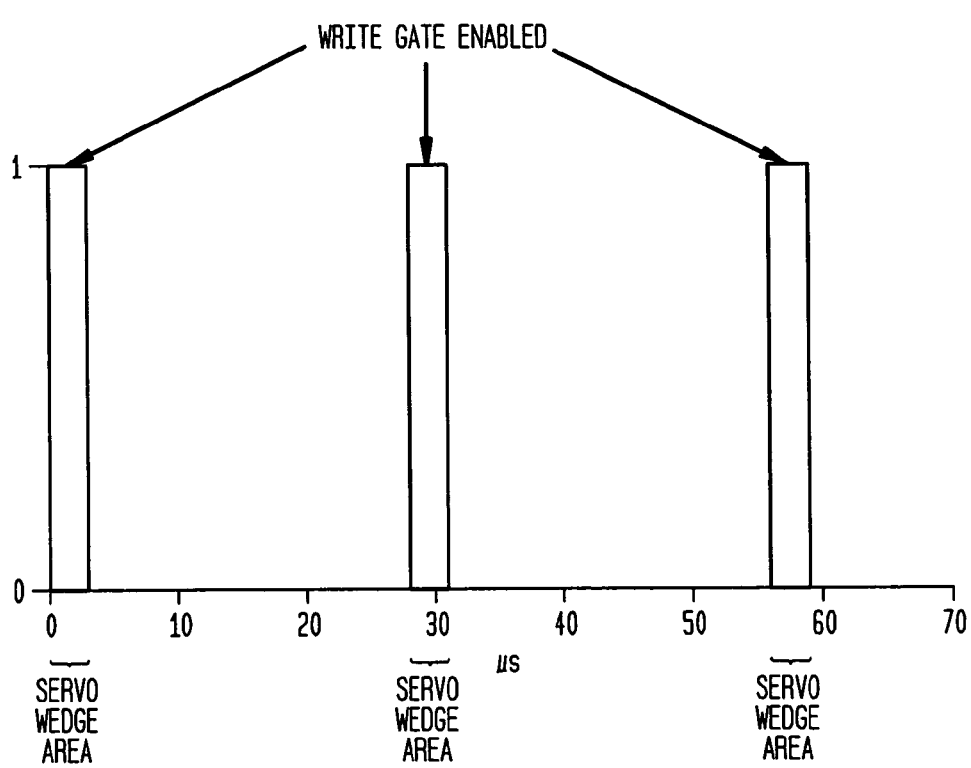
FIG. 2 shows prior art SBWM write gate timing and duty cycles for recording servo sector information with a write gate opening only on servo wedge areas.

If the test of step 402 determines that no prior recorded data is present on the disc surface, then the method advances to step 403. At step 403, the WG controller generates a WG signal corresponding to enabling the WG only on every servo wedge field for the identified disc surface, such as illustrated in FIG. 2. At step 404, the write head unit writes servo data patterns only in the servo wedge field (the servo data segments) of the disc surface. From step 404, the method advances to step 407.

If the test of step 402 determines that prior recorded data is present on the disc surface, then the method advances to step 405. At step 405, the WG controller generates a WG signal, such as illustrated below in FIG. 5, corresponding to enabling the WG during each servo wedge field and during alternating data fields (sector segments) between the servo wedges for the identified disc surface. At step 406, the write head unit writes servo data patterns to the servo wedge fields of the disc surface, and null data (either an erase signal or a predefined pattern) to alternating sector segments of the disc surface. From step 406, the method advances to step 407.

At step 407, a test determines whether the last disc surface has been written. If the test of step 407 determines that the last disc surface has not been written, then the method returns to step 408 for the next disc surface. From step 408, the method returns to step 402. If the test of step 407 determines that the last disc surface has been written, then the method advances to step 409. At step 409, the method finishes processing for the disc drive, and returns to step 401 to repeat the process for the next disc drive, if required.

Figure 5:
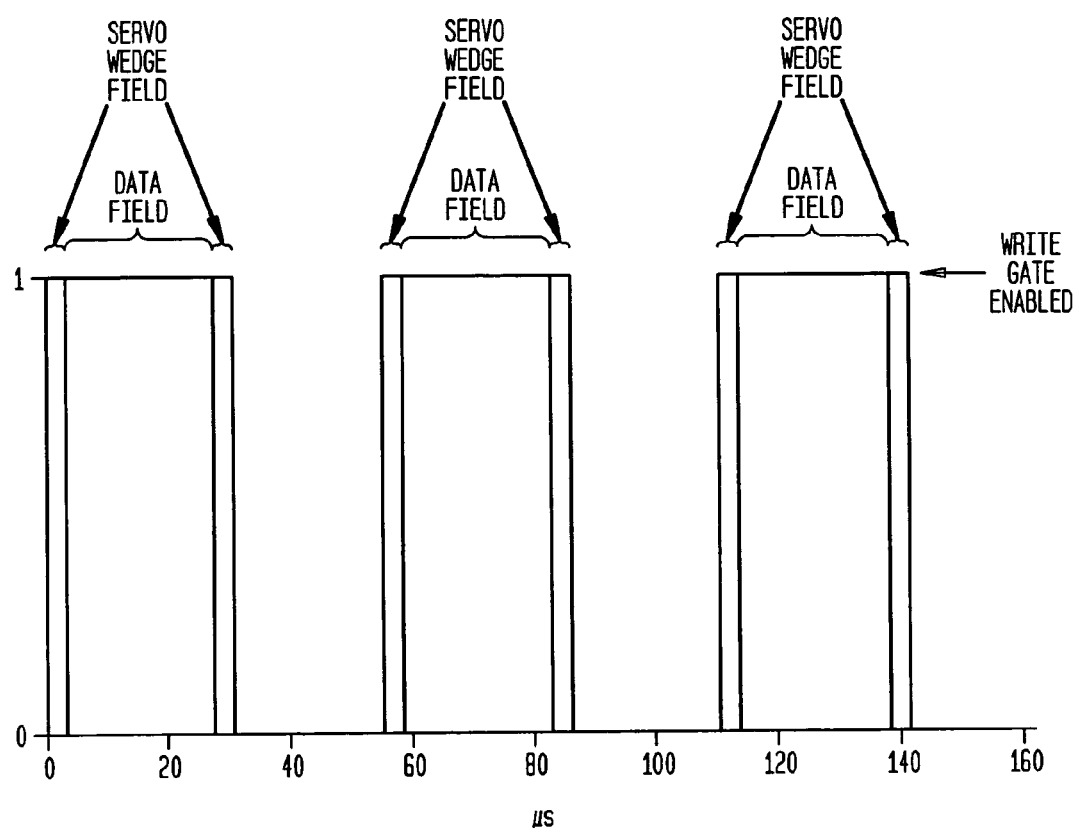
FIG. 5 shows exemplary SBWM write gate timing and duty cycles for recording servo sector information for the method of FIG. 4.

At step 405, WG controller 303 generates the WG signal as shown in FIG. 5, where the timing along the x-axis of the exemplary WG signal of FIG. 4 is in accordance with a 7200RPM drive. As shown in FIG. 5, the WR signal enables (logic 1) the WG for each servo wedge field and during alternate data fields between the servo wedge fields. Other embodiments of the present invention might employ different periods for occasionally writing the data field portions. For example, the WG signal might be enabled for each servo wedge and during randomly selected data fields between servo wedges.

Figure 1:
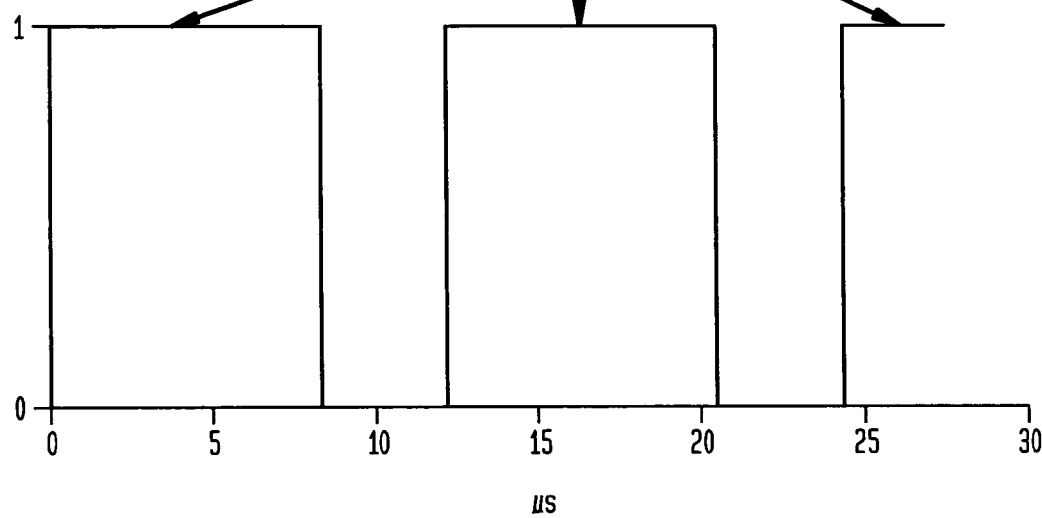
FIG. 1 shows prior art servo bank write mode (SBWM) write gate timing and duty cycles for recording servo sector information with a staggered bank technique.

The WG duty cycle for the WG signal shown in FIG. 5 is as follows. If the servo wedge field is about 10% (0.1) of the total space and the data field is about 90% (0.9) of the total space, then the effective timing "WG_Duty_One_Rev" within one rev is (0.1+0.9+0.1/(0.1+0.9+0.1+0.9) *100%, or proximately 55%. The Total Effective WG Duty Cycle "WG_Final_Duty_Cycle" when time for write head movement is accounted for is WG_Duty_One_Rev*WG_Duty_Cycle_0 (approximately 62.4% to 67.5%, from FIG. 1), which is between 34.32% and 37.125%

Employing a WG signal in accordance with an exemplary embodiment of the present invention for writing servo data patterns allows for the following advantages. Employing a WG signal reduces the WG duty cycle, and so increases throughput, while providing erasure of pre-recorded servo data to prevent error lock on a wrong (e.g., old) servo data pattern. Such method increases the number of heads that may be selected for a given preamp employed for the write head. For example, if a given preamp allows for 2-head writing of servo bank information, a recording system operating in accordance with an exemplary embodiment of the present invention might employ this same preamp for up to 6-head writing of servo bank information.

A servo write head system employing one or more embodiments of the present invention may have substantially improved performance over prior art systems. Reducing the WG duty cycles reduces the power dissipation of both the write channel preamp and read channel amplifiers. Reducing the preamp power consumption allows disc drive designers to perform multi-channel servo bank write within one pass without violating the preamplifier's maximum power constraint. For the described exemplary embodiment, the duty cycle of WG opening is reduced from 62.4% to 67.5% of prior art systems to 34.32% to 37.125%. The present invention allows disc drive designers to dramatically improve servo write throughput and drive yield with little or no modification of existing systems.

While the present invention has been described with respect to exemplary embodiments of a magnetic recording system, the present invention is not so limited. One skilled in the art might extend the teachings herein to other types of recording systems, such optical recording systems.

The present invention can be embodied in the form of methods and apparatuses for practicing those methods. The present invention can also be embodied in the form of program code embodied in tangible media, such as floppy discettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for recording one or more servo data patterns to a recording medium, the apparatus comprising:
   a write gate controller adapted to generate a write gate signal, the write gate signal allowing for writing of data to the recording medium by a write head,
   wherein timing of the write gate signal enables the write head to 1) write a servo data pattern as the data to a corresponding servo data segment of the recording medium and, 2) if the recording medium includes prior recorded data, write null data as the data over selected sector segments of the recording medium.

2. The invention as recited in claim 1, wherein the timing of the write gate signal enables the write head to write the null data over alternating sector segments.

3. The invention as recited in claim 1, wherein:
   the apparatus is embodied in an integrated circuit of a magnetic recording system that includes a magnetic hard drive disc and a head stack assembly;
   the servo data segment is a servo wedge field of a hard disc having a wedge-based servo sector configuration;
   the apparatus comprises a write gate and a preamplifier coupled to the write head;
   the write head is adapted to write the data to the recording medium;
   the write gate signal is applied to the write gate to transfer the data to the preamplifier; and
   the preamplifier provides one or more of the servo data pattern and the null data as the data to the write head.

4. The invention of claim 1, wherein:
   the recording medium has a plurality of servo data segments used for storing servo-positioning data; and
   the servo data segments are interleaved with a plurality of sector segments used for storing non-servo-positioning data.

5. The invention of claim 4, wherein the null data is written to only one or more entire sector segments.

6. The invention of claim 5, wherein the apparatus is adapted to select the one or more sector segments on which to write the null data.

7. The invention of claim 4, wherein no portion of the null data is written to any servo data segments.

8. A method of recording one or more servo data patterns to a recording medium, the method comprising the steps of:
   (a) generating a write gate signal for writing of data to the recording medium by a write head,
   (b) adjusting timing of the write gate signal to 1) write a servo data pattern as the data to a corresponding servo data segment of the recording medium and, 2) if the recording medium includes prior recorded data, write null data as the data over selected sector segments of the recording medium.

9. The invention as recited in claim 8, wherein step (b) adjusts the timing of the write gate signal to enable the write head to write the null data over alternating sector segments.

10. The invention as recited in claim 8, wherein:
    the method is implemented by a processor in an integrated circuit of a magnetic recording system;
    the servo data segment is a servo wedge field of a hard disc having a wedge-based servo sector configuration;
    a write gate adapted to generate the write sate signal and a preamplifier are coupled to the write head; and
    step (b) comprises the step of applying the write gate signal to the write gate to transfer the data to the preamplifier.

11. The invention of claim 8, wherein:
    the recording medium has a plurality of servo data segments used for storing servo-positioning data; and
    the servo data segments are interleaved with a plurality of sector segments used for storing non-servo-positioning data.

12. The invention of claim 11, wherein the null data is written to only one or more entire sector segments.

13. The invention of claim 12, further comprising selecting the one or more sector segments on which to write the null data.

14. The invention of claim 11, wherein no portion of the null data is written to any servo data segments.

15. A computer-readable medium having stored thereon a plurality of instructions, the plurality of instructions including instructions which, when executed by a processor, cause the processor to implement a method for recording one or more servo data patterns to a recording medium, the method comprising the steps of:
    (a) generating a write gate signal for writing of data to the recording medium by a write head,
    (b) adjusting timing of the write gate signal to 1) write a servo data pattern as the data to a corresponding servo data segment of the recording medium and, 2) if the recording medium includes prior recorded data, write null data as the data over selected sector segments of the recording medium.

16. The invention of claim 15, wherein:
    the recording medium has a plurality of servo data segments used for storing servo-positioning data; and
    the servo data segments are interleaved with a plurality of sector segments used for storing non-servo-positioning data.

17. The invention of claim 16, wherein the null data is written to only one or more entire sector segments.

18. The invention of claim 17, wherein the method further comprises selecting the one or more sector segments on which to write the null data.

19. The invention of claim 16, wherein no portion of the null data is written to any servo data segments.

* * * * *